Jan. 28, 1947.   O. T. BARRETT ET AL   2,414,922
ONION TOPPING DEVICE
Filed Jan. 3, 1945   2 Sheets-Sheet 1
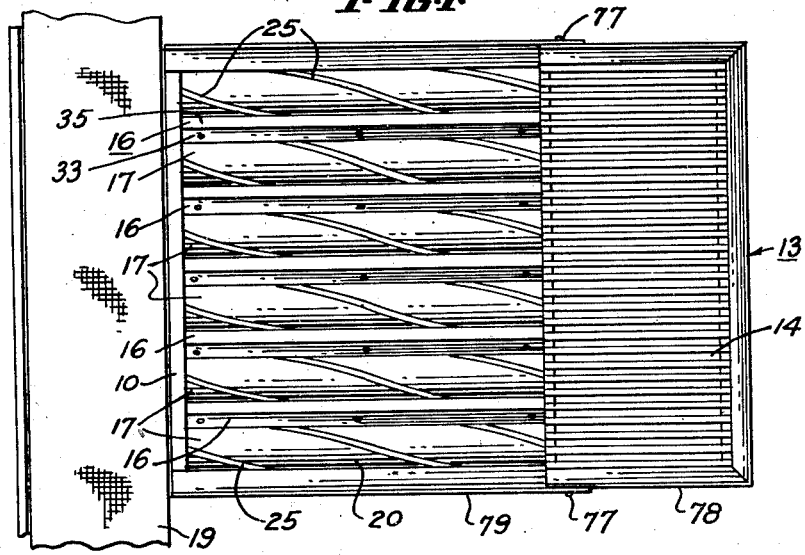
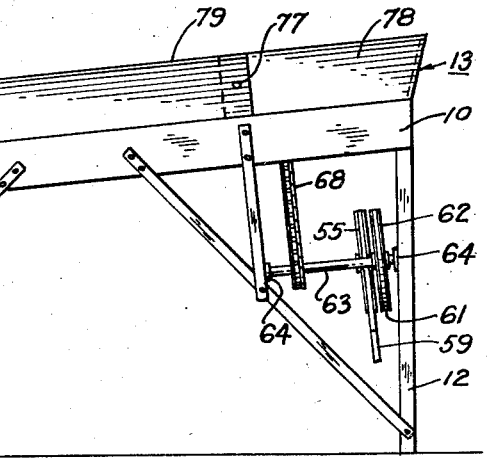
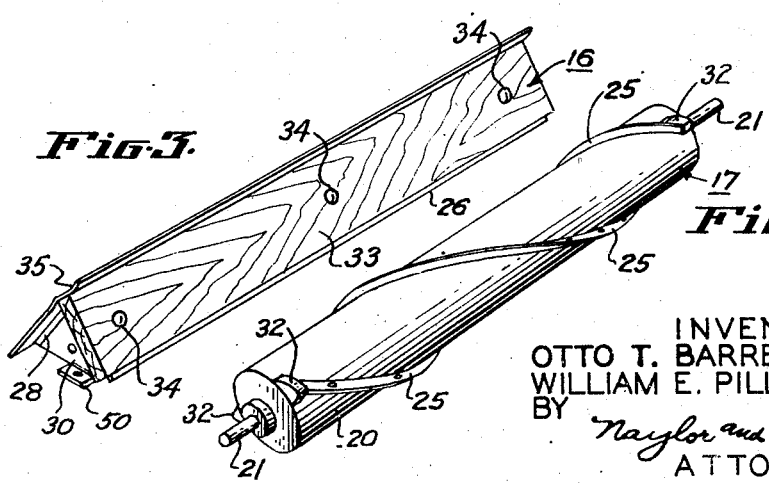
INVENTORS
OTTO T. BARRETT
WILLIAM E. PILLIAR
BY
Naylor and Lassagne
ATTORNEYS

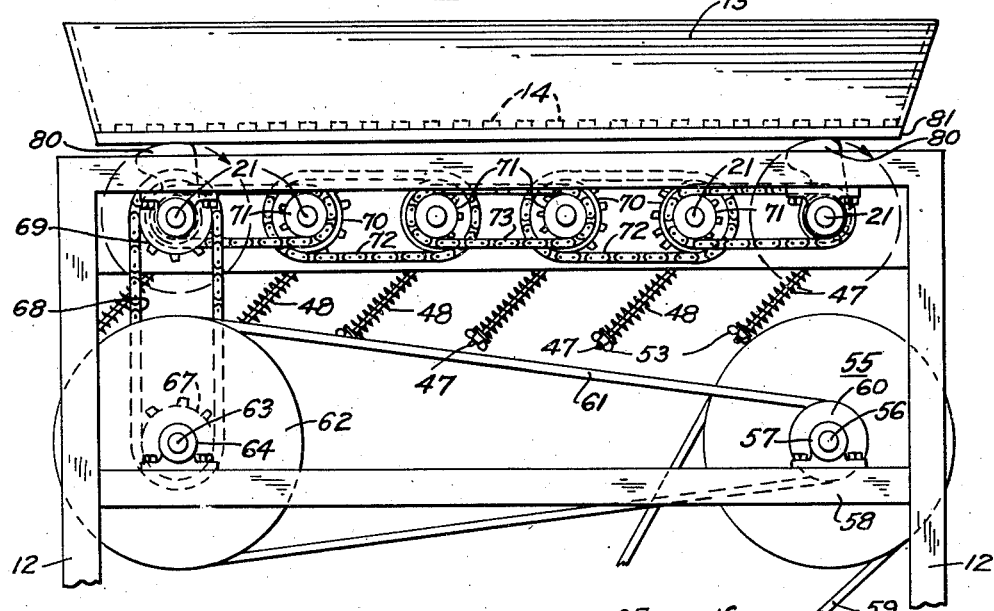
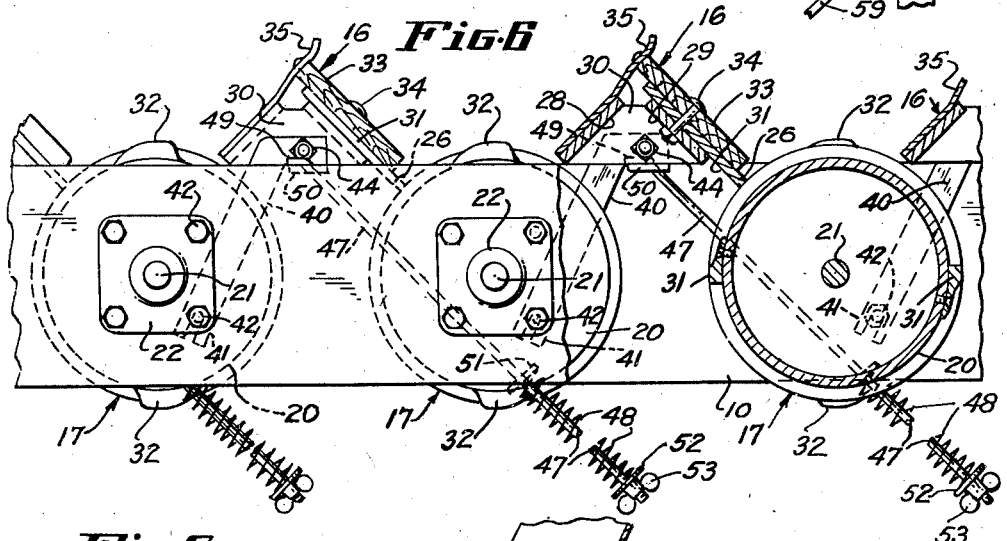
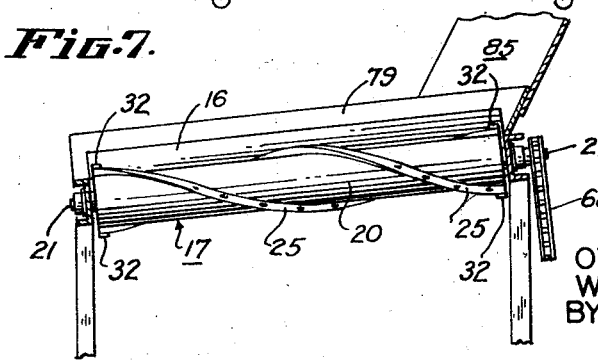

Patented Jan. 28, 1947

2,414,922

UNITED STATES PATENT OFFICE 2,414,922

ONION TOPPING DEVICE

Otto T. Barrett and William E. Pilliar, Salinas, Calif., assignors to Otto T. Barrett and William E. Pilliar, as trustees Application January 3, 1945, Serial No. 571,144

4 Claims. (Cl. 146—83)

This invention relates to apparatus for topping onions; that is to say, the separation of the stems from the bulb in the preparation of the products for storage and marketing.

It is an object of this invention to provide an apparatus which will materially speed up the separation of stems and bulbs at a greatly reduced cost of operation. It is an additional object of the invention to provide a device of the character described which will affect separation of stem and bulb without damage or injury to the marketable portion of the produce and which, at the same time, will seal off the bulb tube in the manner required by the practice of the industry and, in some instances, by regulation with a view to improving the keeping quality of the onion.

These and other objects of the invention will become more apparent as this specification proceeds, and the novelty of the device will be pointed out in the appended claims with the requisite degree of particularity.

In the drawings forming a part hereof

Figure 1 is a top plan view of an onion topper embodying the principles of the invention.

Figure 2 is a side elevation of the device of Figure 1.

Figure 3 is a perspective view of one of the cutter bars utilized in the device.

Figure 4 is a perspective view of one of the feeder rolls employed in the device.

Figure 5 is an end elevation of the machine showing the drive mechanism employed.

Figure 6 is a fragmentary enlarged end elevation showing the relative positions of the cutter bars and the feeder rolls, and Figure 7 is a modification of the device of Figure 1.

The onion topper forming the subject matter of this application has been designed for stationary use; that is to say, in the packing sheds or it may be mounted upon a conveyance and used in the fields as an incident of the harvesting or gathering of the onions. The embodiment of the invention described and illustrated herein utilizes a main frame 10 supported in inclined relation to the ground surface upon conventional legs 11 and 12. At its upper or feed end the device is provided with a hopper 13 having a slatted bottom 14 for the screening out of any foreign matter deposited therein with the supply of onions.

The hopper 13 is mounted for vertical, reciprocatory motion to facilitate the screening out of foreign matter, as will be more fully explained at a later point in this specification.

The actual separation of onion bulbs and stems is effected by means of a plurality of cutter bars 16 and feeder rolls 17 alternately arranged longitudinally of the frame 10 (see Figs. 1 and 6). As illustrated in Figs. 1 and 2, the discharge of the treated onions may be picked up by any conventional conveyor means such as the belt 19 and transported to storage or sacking facilities.

The characteristics of the feeder rolls employed in this machine can be best understood by reference to Fig. 4, wherein the body of the roll is indicated as being an elongated cylinder 20 having closed ends and stub shafts 21 projecting from each of such ends for journaling in bearings 22 disposed in the crossbars of the frame 10 (see Fig. 6).

Additionally, it will be noted that the feeder rolls 17 are each provided with a pair of spirals 25 which serve to progress the onions from intake end to discharge end of the mechanism, and the said spirals have the added function of coacting with a blade 26 on the cutter bar 16 to effect a shearing of the onion tops from the bulbs.

The cutter bars 16 are best understood from Figs. 3 and 6, wherein it will be noted that the bar assembly is triangular in cross-section. The assembly includes rigid plate members 28 and 29 oppositely arranged on a plurality of spacer members 30 and to which they may be welded. Secured on the face of the plate 29 there is a blade bar 31 having a tempered and sharpened leading edge 26 projecting considerably beyond the bottom edge of the plate 29. In order to protect the bulb of the onion we provide a wooden cover board 33 for blade bar 31, and the two elements, that is, the blade bar 31 and the cover board 33, may be secured to plate 29 in any manner such as by bolts 34. On the opposite side of the triangle we provide a sheet metal shield 35 as a means of preventing the onion from falling between the feeder rolls 17 and the cutter bars 16.

As will be noted from Fig. 6, the cutter bars are yieldably mounted in relation to the feeder rolls. The mount employed herein consists in a link 40 having one end forked as at 41 to engage one of the retainer bolts 42 for end bearings 22 and its other end bent at an angle for connection to one of the spacer members 30 in the cutter bar assembly by any means, such as the bolt 44. It will thus be seen that the cutter bars 16 are free to rock on the bearing point provided by the bolt 44. The cutter bars are yieldably held downwardly for contact of the cutting edge 26 of blade 31 and spirals 25 by means of rod 47 and the coil spring 48. Rod 47 has an in-turned toe 49 engaging a lug 50 on the cutter bar assembly and extends through an ear 51 on the crossbar member of frame 10, being provided at its lower end with the coil spring 48 disposed thereon between the ear 51 and a washer 52, the latter being secured by a wing nut 53. The rocking of the cutter bar assembly 16 on the mount thus described is effected by a pair of cams 32 oppositely arranged at 180° at each end of the rolls 29, as will be brought out in the description of the operation of the device.

The drive means employed in connection with the presently disclosed embodiment of the invention contemplates the synchronized rotation of all of the feeder rolls 17 in relation to the stationary cutter bar assemblies 16. As seen in Fig. 5, a pulley 55 on shaft 56, suitably journaled in a bearing member 57 on a cross bar 58 between the legs 12, is connected with any suitable source of power (not shown) by a belt 59. The speed of this drive is reduced by a smaller pulley 60 on shaft 56 and from thence transmitted by a belt 61 to pulley 62 on shaft 63 in bearing member 64 on the opposite end of the cross bar 58. Shaft 63 may, if desired, be provided with any conventional clutching and de-clutching mechanism (not shown). Power taken off of shaft 63 is transmitted by sprocket 67 and chain 68 to a sprocket 69 keyed on the stub shaft 21 of one of the feeder rolls 17. As indicated in Fig. 5, each of the stub shafts 21 is provided with a large sprocket 70 and a smaller sprocket 71 for interconnection and synchronization of the drive of the feeder rolls through chains 72 and 73, respectively.

In the form illustrated in Figs. 1 and 2, the hopper 13 as hereinabove stated, is adapted for vertical, reciprocatory motion to agitate the onions and screen out therefrom all foreign matter. In this form the point of anchorage of the hopper is the single bolt 77 connecting the lower end of the side blade 78 of the said hopper with the side member 79 on frame 10. Vibratory motion is imparted to the hopper by means of the cams 80 keyed on the stub shafts 21 of the feeder rolls 17, the cams bearing on a bar 81 extending transversely of the bottom of the hopper 13. A rise on the order of 1¾ inches has been found sufficient to impart the desired agitation of the hopper contents.

In the modification illustrated in Fig. 7, hopper 13 has been eliminated and the companion feeder rolls 17 and cutter bar assemblies 16 have been lengthened to simply increase the period during which the onions are subjected to the combined action of the feeder rolls 17 and the cutter bars 16. In this modification side members 79 are likewise extended the full length of the apparatus and, if desired, a rigid hopper such as that illustrated at 85 may be added at the intake end of the device.

The operation of the device is as follows:

Unstemmed onions are fed into the hopper 13, and the latter is vibrated by means of the cams 80 to screen out foreign matter through its slatted bottom 14. Agitation of hopper 13, and the inclination of frame member 10, causes the onions to progress toward the bottom of alternately arranged feeder rolls 17 and cutter bar assemblies 16. The spirals 25 on the feeder rolls 17 bear against the cutter 26 in the cutter bar assembly 16 and urge the onions against cover board 33 in that assembly, much as a worm conveyor. Twice in each revolution of feeder rolls 17 cams 32 will contact blade 26 and rock the cutter bar assembly 16 on its pivot point at bolt 41 and against the tension of the coil spring 48 to separate cutter bar 26 from its contact with spirals 25. In this periodic operation of the spirals 25 and the blade 26 an opening is created permitting the onion tops to be drawn under the edge of blade 26 and as the knife assembly 16 drops from the high point of cams 32, the spirals 25 and the blades 26 will affect a shearing of the said top from the bulb of the onion. Once this operation has taken place the detopped onion will simply roll downwardly in the slot defined by cover board 33 and the face of the feeder roll 17, the spirals 25 of which then functions as a worm conveyor.

In the modification shown in Fig. 7 the topping action of the mechanism is identical with that of the device in Fig. 1 just described, being merely prolonged.

It will be appreciated that changes may be effective in the machine shown and described herein without departing from the spirit of the invention, and hence full protection is desired within the scope of the appended claims.

The invention claimed is:

1. An onion topping device comprising, a frame, a plurality of alternately arranged cutter bars and feeder rolls disposed longitudinally in the frame, said cutter bars normally bearing upon the feeder rolls but rockably and yieldably mounted in relation thereto, and means carried by the feeder rolls for periodically rocking the cutter bars to break their contact with the feeder rolls.

2. An onion topping device comprising, a frame, a cutter bar rockably mounted on the frame, a feeder roll rotatably supported on the frame, spiral projections on the feeder rolls against which the cutter bar normally bears to produce a shearing cut, and cam means carried by the feeder rolls to rock the cutter bar and separate the latter from the spiral projections on the feeder roll.

3. An onion topping device comprising, a frame, a cutter bar rockably and yieldably mounted on the frame, spiral projections on the feeder roll against which the cutter bar normally bears to produce a shearing cut, and means carried by the feeder roll to periodically rock the cutter bar away from the spiral projection on the feeder roll to provide a slot therebetween through which the onion tops may be fed.

4. An onion topping device comprising, a frame, a cutter bar, an arm on the cutter bar pivotally connected to the frame, a rod connected to said cutter bar and having a yieldable connection with said frame, a feeder roll rotatably supported on the frame parallel to the cutter bar, spiral projections on the feeder roll against which the cutter bar normally bears to affect a shearing cut, and cam means carried by the feeder roll to periodically rock the cutter bar away from the spiral projection to provide a slot therebetween through which the onion tops may be fed.

OTTO T. BARRETT.
WILLIAM E. PILLIAR.